(12) United States Patent
Reber et al.

(10) Patent No.: US 12,704,883 B2
(45) Date of Patent: Aug. 11, 2026

(54) EXTERNAL COMMUNICATIONS PORTS COVER FOR COMPUTING DEVICES

(71) Applicant: ZEBRA TECHNOLOGIES CORPORATION, Lincolnshire, IL (US)

(72) Inventors: David William Reber, Cedar Park, TX (US); Zichun Song, Cedar Park, TX (US); Mark Thomas Fountain, Hitchin (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/115,270

(22) Filed: Feb. 28, 2023

(65) Prior Publication Data

US 2024/0288911 A1 Aug. 29, 2024

(51) Int. Cl.

| | |
|---|---|
| ***G06F 1/16*** | (2006.01) |
| ***G06F 1/18*** | (2026.01) |
| ***H01R 13/44*** | (2006.01) |
| ***H01R 13/52*** | (2006.01) |

(52) U.S. Cl.

CPC .......... *G06F 1/1679* (2013.01); *G06F 1/1626* (2013.01); *G06F 1/1656* (2013.01); *G06F 1/1671* (2013.01); *G06F 1/181* (2013.01); *G06F 1/182* (2013.01); *H01R 13/44* (2013.01); *H01R 13/52* (2013.01); *Y10T 292/0801* (2015.04)

(58) Field of Classification Search

CPC ...... G06F 1/1656; G06F 1/1679; G06F 1/181; G06F 1/1626; G06F 1/1671; G06F 1/182; G06F 1/1616; G06F 1/1662; G06F 1/1669; G06F 1/1675; H05K 5/0221; H05K 5/03; H01R 13/5213; H01R 13/44; H01R 13/52; H01R 2201/06; Y10T 292/0801; H01H 2223/00; H04B 1/3888

See application file for complete search history.

(56) References Cited

U.S. PATENT DOCUMENTS

| | | | | |
|---|---|---|---|---|
| 7,789,437 B2 * | 9/2010 | Sheng | G06F 1/1658 | 292/145 |
| 8,045,323 B2 * | 10/2011 | Murakata | H05K 5/03 | 361/679.01 |
| 8,199,464 B2 * | 6/2012 | Zuo | H01R 13/5213 | 361/679.01 |

(Continued)

OTHER PUBLICATIONS

Thesaurus, Synonyms for Pogo Pin, 2024, https://www.powerthesaurus.org/pogo_pin/synonyms (Year: 2024).*

*Primary Examiner* — Allen L Parker
*Assistant Examiner* — Martin Antonio Asmat Uceda

(57) ABSTRACT

A computing device includes: a housing having an exterior wall, the exterior wall defining a chamber; an access door movably coupled to the housing between a closed position enclosing the chamber, and an open position exposing the chamber to an exterior of the computing device; a latch movable between a locked position to retain the access door in the closed position, and an unlocked position to permit movement of the access door; and a bias element configured to apply a force to an interior of the access door to move the access door from the closed position to an intermediate position between the open and closed positions, in response to transition of the latch from the locked position to the unlocked position.

14 Claims, 8 Drawing Sheets

(56) References Cited

U.S. PATENT DOCUMENTS 8,199,470 B2 * 6/2012 Yang ........................ H05K 5/03
455/575.8
8,934,224 B2 * 1/2015 Iwamoto .............. H01R 13/447
439/153
9,390,746 B2 * 7/2016 Lee ....................... G06F 1/1656
9,451,717 B2 * 9/2016 Proctor ................... G06F 1/181
9,560,782 B2 * 1/2017 Lee ........................ H05K 5/068
10,296,050 B2 * 5/2019 Shindo ...................... G06F 1/16
10,990,135 B2 * 4/2021 Joo ....................... G06F 1/1656
11,152,036 B2 * 10/2021 Kuriyama ................. G06F 1/16
11,337,319 B2 * 5/2022 Lee ....................... E05B 65/001
11,602,206 B1 * 3/2023 Troedson ............... A45C 11/00
11,733,737 B2 * 8/2023 Lee ....................... G06F 1/1658
361/679.02
11,800,671 B2 * 10/2023 Yamamoto ........... H05K 5/0221
12,075,585 B2 * 8/2024 Hsu .......................... H05K 5/03
2010/0313485 A1 * 12/2010 Kuo ....................... H05K 5/061
49/484.1
2011/0032664 A1 * 2/2011 Long ........................ H05K 5/03
361/679.01
2013/0105192 A1 * 5/2013 Huang ..................... H05K 5/03
174/50
2014/0268516 A1 * 9/2014 Fathollahi ................. A45F 5/00
361/679.01
2016/0143164 A1 * 5/2016 Wang .................. H05K 5/0221
403/325
2019/0360241 A1 * 11/2019 Mori ..................... G06F 1/1616
2024/0302862 A1 * 9/2024 Usuginu ............... G06F 1/1635

* cited by examiner

EXTERNAL COMMUNICATIONS PORTS COVER FOR COMPUTING DEVICES

BACKGROUND

Certain computing devices, such as tablet computers, can include externally-exposed communications ports. Such ports may be exposed to various environmental contaminants, such as water, dust, and the like. Computing devices can therefore be provided with covers for such ports, but the covers may increase the cost and complexity of the devices, and/or impede access to the ports by operators of the devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
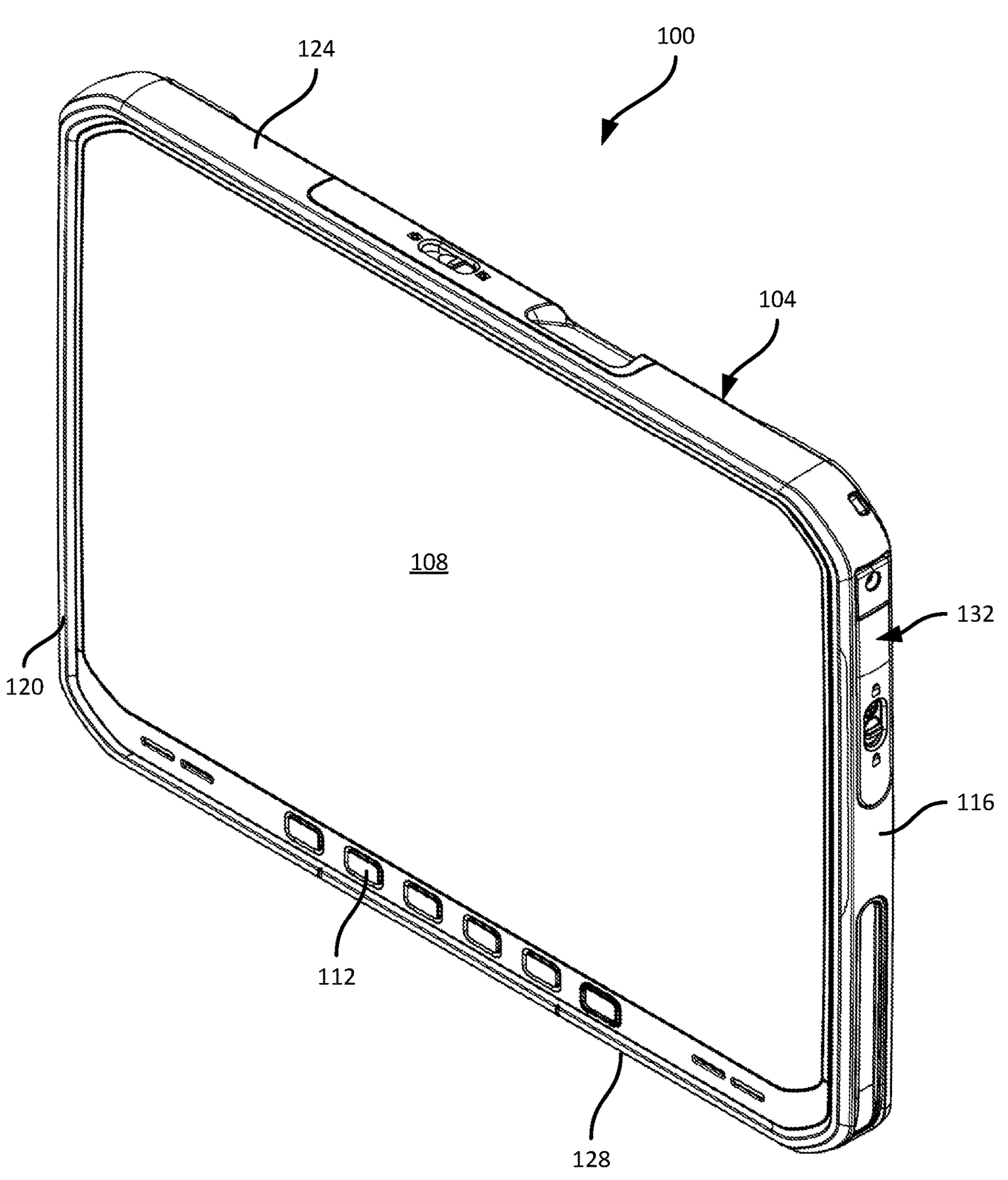
FIG. 1 is a front perspective view of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, comprising: a housing having an exterior wall, the exterior wall defining a chamber; an access door movably coupled to the housing between a closed position enclosing the chamber, and an open position exposing the chamber to an exterior of the computing device; a latch movable between a locked position to retain the access door in the closed position, and an unlocked position to permit movement of the access door to the open position; and a bias element configured to apply a force to the access door to move the access door from the closed position to an intermediate position between the open and closed positions, in response to transition of the latch from the locked position to the unlocked position.

FIG. 1 illustrates a mobile computing device 100 (also referred to herein as the device 100), such as a tablet computer. In other examples, the computing device 100 can be implemented in other form factors, including as a smartphone, a wrist-mounted mobile computer, a laptop computer, or the like. The device 100 includes a housing 104 supporting various other components of the device 100, such as a display 108 disposed on a front of the device 100 (e.g., a side of the device 100 configured to face an operator of the device 100). The housing 104 can also support various other components, including function buttons 112, and the like, as well as various internal components of the device 100.

The housing 104 includes a set of exterior walls extending from a front of the device 100 (e.g., where the display 108 is supported) to a back of the device 100 opposite the display 108. In the illustrated example, the exterior walls include a side wall 116, as well as an opposing side wall 120, a top wall 124 and a bottom wall 128. At least one of the exterior walls, e.g., the side wall 116, can include a chamber containing communication ports or the like, such as Universal Serial Bus (USB) ports. To reduce or prevent entry of contaminants such as water, dust, and the like, the chamber can be covered by an access door 132. In the illustrated example, the access door 132 seals the chamber against such contaminants, and an exterior of the access door 132 is substantially flush with the side wall 116 when the access door is closed. The device 100 and the access door 132 include further structural features, discussed below, to facilitate access to the above-mentioned chamber, e.g., by simplifying the process by which an operator of the device 100 can gain access to the chamber.

Figure 2:
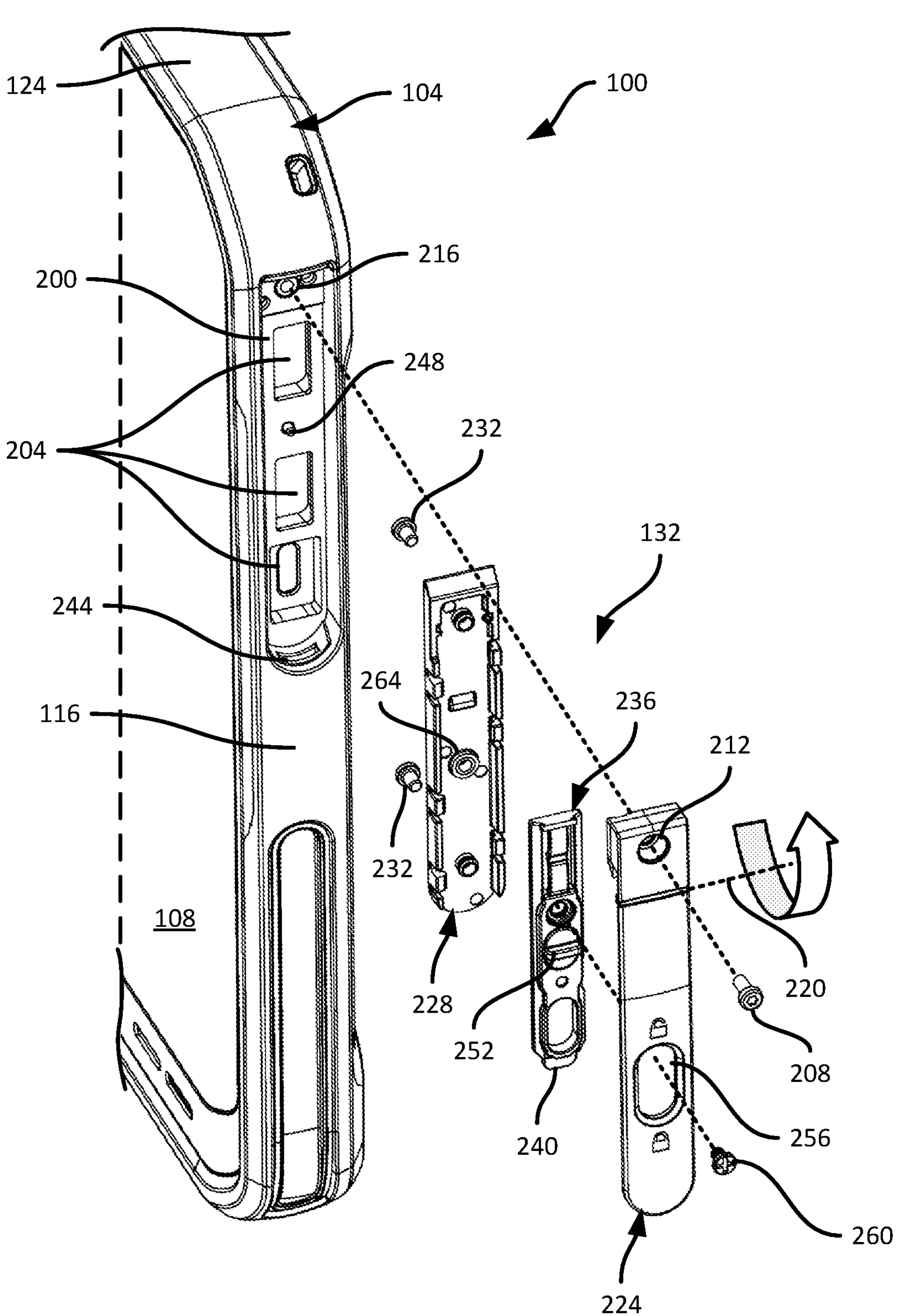
FIG. 2 is an exploded view of an access door of the mobile computing device of FIG. 1.

Turning to FIG. 2, an exploded view of the access door 132 is shown alongside a partial view of the remainder of the device 100. As shown in FIG. 2, the device 100 includes a chamber 200 defined in the exterior wall 116. The chamber 200 can, for example, extend inwards (e.g., into the housing 104) from the exterior wall 116. The device 100 can include one or more communication ports 204 (three ports 204 are shown in this example) disposed within the chamber 200. The computing device 100 can be connected to various other devices via the ports 204, such as power sources, other computing devices, and/or peripheral devices such as printers, barcode scanners, or the like. In other examples, the chamber 200 can contain elements other than the ports 204, or elements in addition to the ports 204.

The access door 132 is movably coupled to the housing 104. The access door 132 is coupled to the housing 104, in this example, by a fastener 208 configured to extend through an opening 212 of the access door 132 and engage with an opening 216 defined by the housing 104 within the chamber 200. The access door 132 is movable between a closed position (shown in FIG. 1) enclosing the chamber 200 (e.g., preventing access to the chamber 200 from an exterior of the device 100), and an open position that exposes the chamber 200 to the exterior of the device 100, permitting access to the ports 204 or other elements within the chamber 200.

In the illustrated example, the access door 132 is movable between the open and closed positions via rotation about an axis 220, defined by a living hinge provided by a cover 224 of the access door 132. For example, the cover 224 of the access door 132 can include a resiliently deformable material (e.g., thermoplastic polyurethane (TPU) or any other suitable plastic, rubber, or the like) defining the living hinge. The remaining components of the access door 132 can be coupled to the device housing 104 via the cover 224.

The remaining components of the access door 132 include, in the illustrated example, an access door body 228, e.g., affixed to the cover 224 by one or more fasteners 232, and a latch 236 movable between a locked position to retain the access door 132 in the closed position, and an unlocked position to permit movement of the access door 132 to the open position. The body 228 can also include a gasket facing the chamber 200, to seal the chamber 200 when the access door 132 is closed. In this example, the latch 236 is slidably mounted between the body 228 and the cover 224, and includes a tab 240 that is configured, when the latch 236 is in the locked position, to extend into a slot 244 defined in the chamber 200. The slot 244, in this example, extends from the chamber 200 into the housing 104, in a plane substantially parallel to the exterior wall 116. When the latch 236 is placed in the locked position, the tab 240 extends into the slot 244 and prevents the access door 132 from opening. When the latch 236 is placed in the unlocked position, the tab 240 is withdrawn from the slot 244, permitting the access door 132 to be opened. As discussed below, the device 100 also includes a bias element 248, such as a pogo pin, disposed within the chamber 200, to push the access door 132 from the closed position towards the open position when the latch 236 is unlocked.

Movement of the latch 236 between the locked and unlocked positions can be performed by manipulation of an actuator 252 affixed to the latch 236, and accessible from an exterior of the device 100, e.g., via an opening 256 in the cover 224. In some examples, the latch 236 can optionally be prevented from unlocking by affixing the latch 236 to the body 228 via a screw or other suitable fastener extending through the opening 256, a corresponding opening in the latch 236, and engaging with an aperture 264 in the body 228.

Figures 3A, 3B:
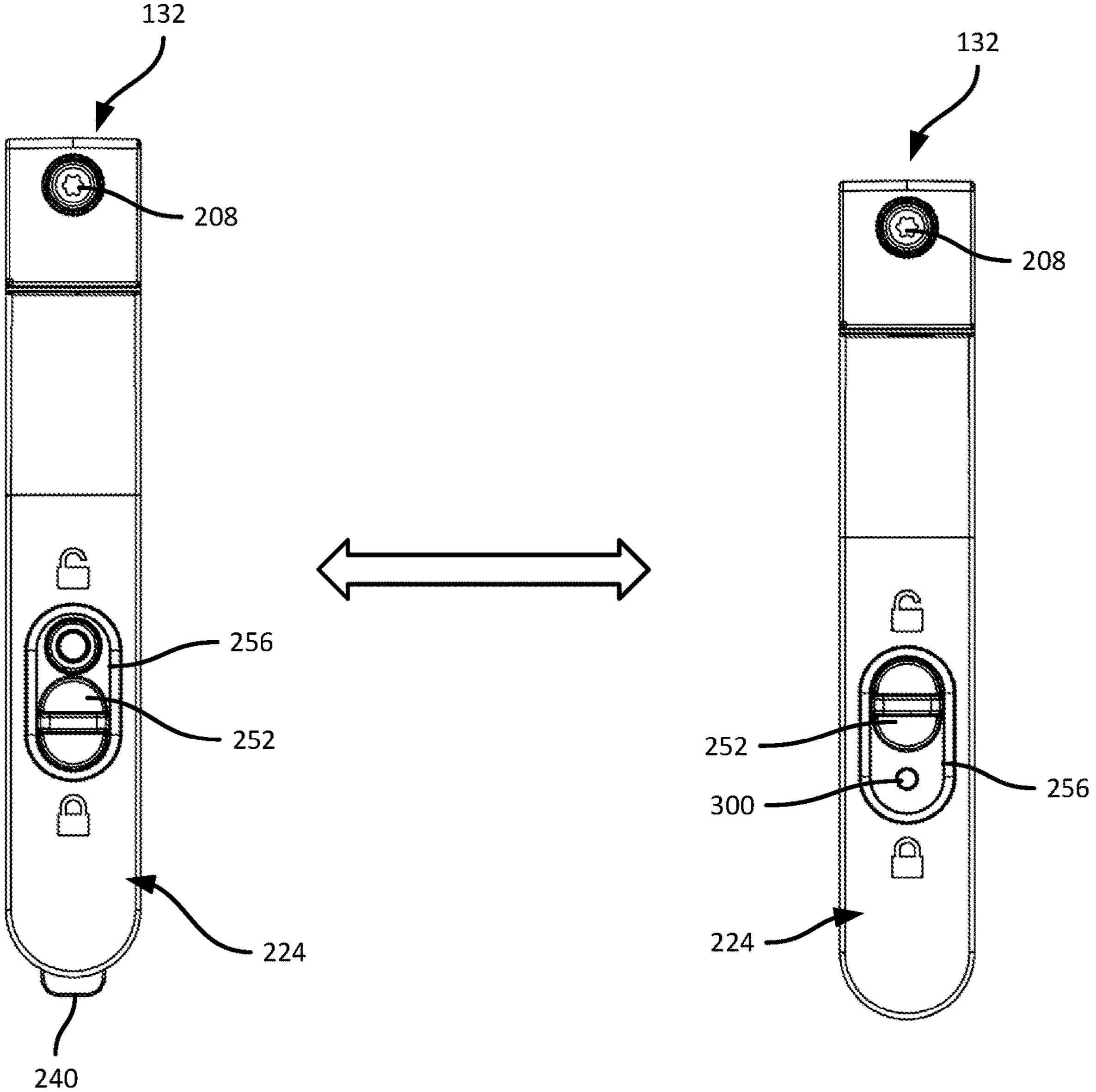
FIG. 3A is a diagram of the access door of FIG. 2, with a latch in a locked position.
FIG. 3B is a diagram of the access door of FIG. 2, with a latch in an unlocked position.

Referring to FIGS. 3A and 3B, the access door 132 is shown in isolation, with the latch 236 in the locked position (FIG. 3A), and in the unlocked position (FIG. 3B). As illustrated, in the locked position, the tab 240 extends beyond the cover 224 and body 228, enabling the tab 240 to extend into the slot 244 and prevent the access door 132 from opening out of the chamber 200. In the unlocked position, in contrast, the tab 240 is withdrawn between the cover 224 and the body 228, e.g., by moving the actuator 252. In some examples, the latch 252 can include a visual indicator 300, such as a colored dot or other shape that is visible through the opening 256 when the latch 236 is unlocked.

Figure 4:
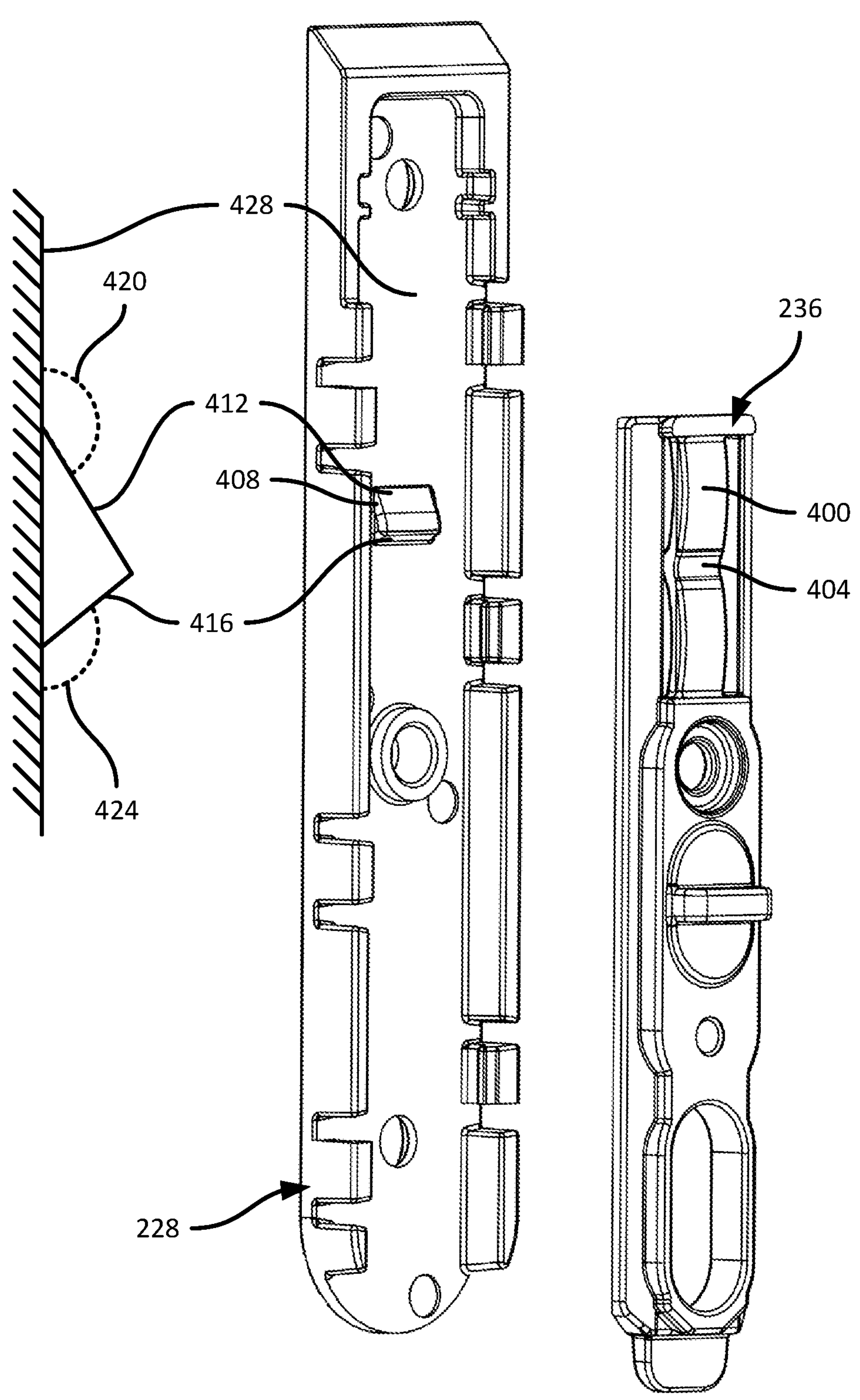
FIG. 4 is a diagram illustrating the body and latch of the access door of FIG. 2 in isolation.

The access door 132 can be configured to retain the latch 236 in the current position, e.g., unless sufficient force is applied to the actuator 252 to move the latch 236 to the opposing position. For example, referring to FIG. 4, the body 228 and the latch 236 are shown in isolation. The latch 236 includes a detent 400, e.g., a flexible spring detent with a movable ridge 404, configured to engage with a protrusion 408 on the body 228. The protrusion thus provides resistance to movement of the latch 236, until sufficient force is applied to deform the detent 400 against the protrusion and cause the ridge 404 to pass over the protrusion 408. In the present example, the protrusion includes a first inclined surface 412 and a second inclined surface 416, with different angles 420 and 424 relative to an outer wall 428 of the body 228. For example, the angle 420 is greater than the angle 424, such that moving the latch 236 to the locked position involves the application of a smaller force than moving the latch 236 to the unlocked position.

Figure 5:
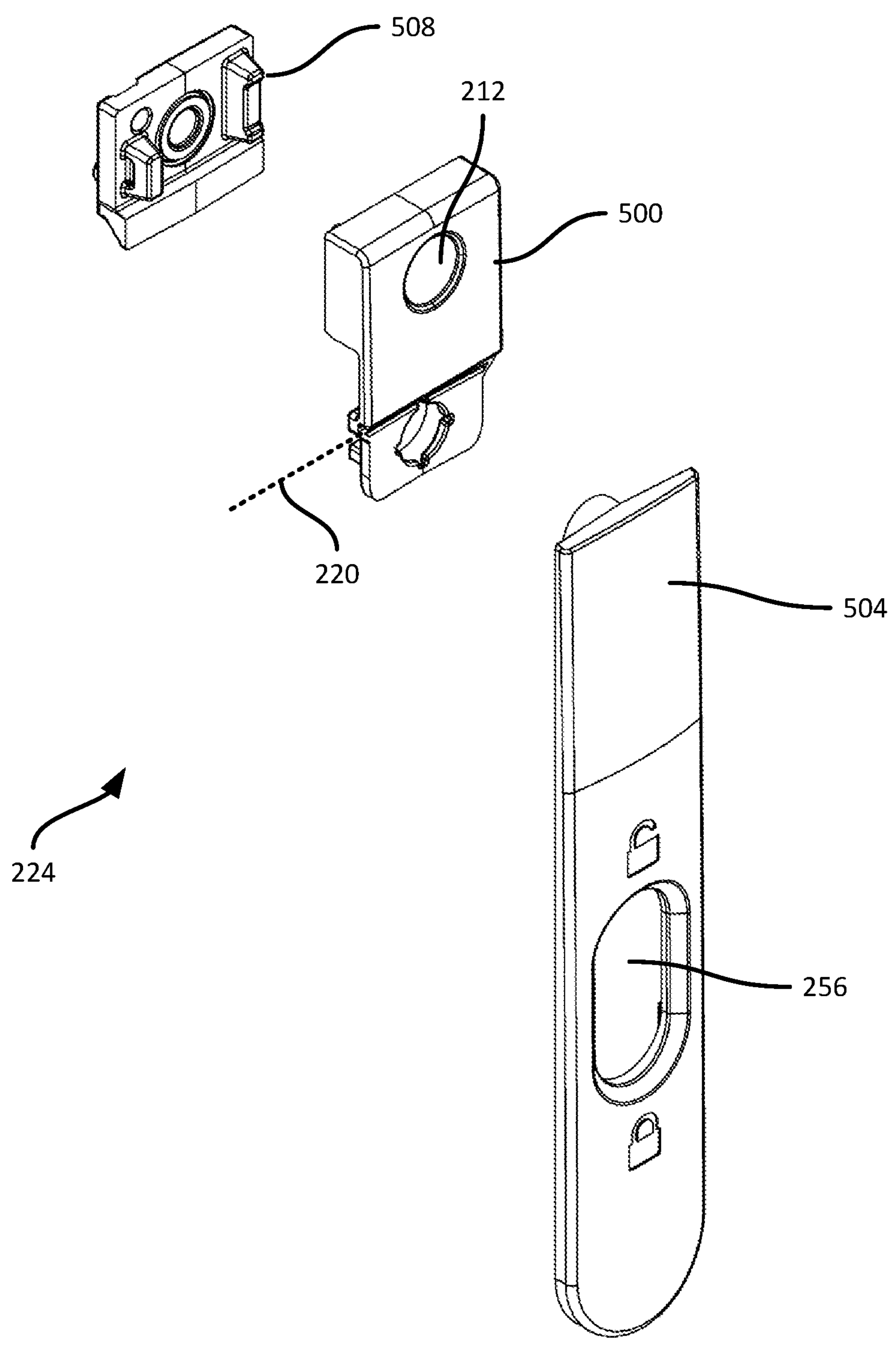
FIG. 5 is an exploded view of the cover of the access door of FIG. 2.

Turning to FIG. 5, an exploded view of the cover 224 is shown. In the illustrated example, the cover 224 includes a first cover member 500 defining the opening 212 and the living hinge mentioned above (e.g., providing the axis 220). The first cover member 500 can be manufactured from TPU or another suitably flexible plastic, rubber, or the like. The cover 224 also includes a second cover member 504 defining the opening 256. The second cover member 504 can be manufactured from a different material than the first cover member 500 (e.g., a stiffer plastic, in some examples). The cover 224 can also, as illustrated, include a third cover member 508, e.g., manufactured from the same material as the second cover member 504. The second and third cover members 504 and 508 can be overmolded (e.g., via injection molding) onto the first cover member 500.

Figure 6:
FIG. 6 is a diagram illustrating the operation of a bias member of the computing device of FIG. 2.
Figure 6:
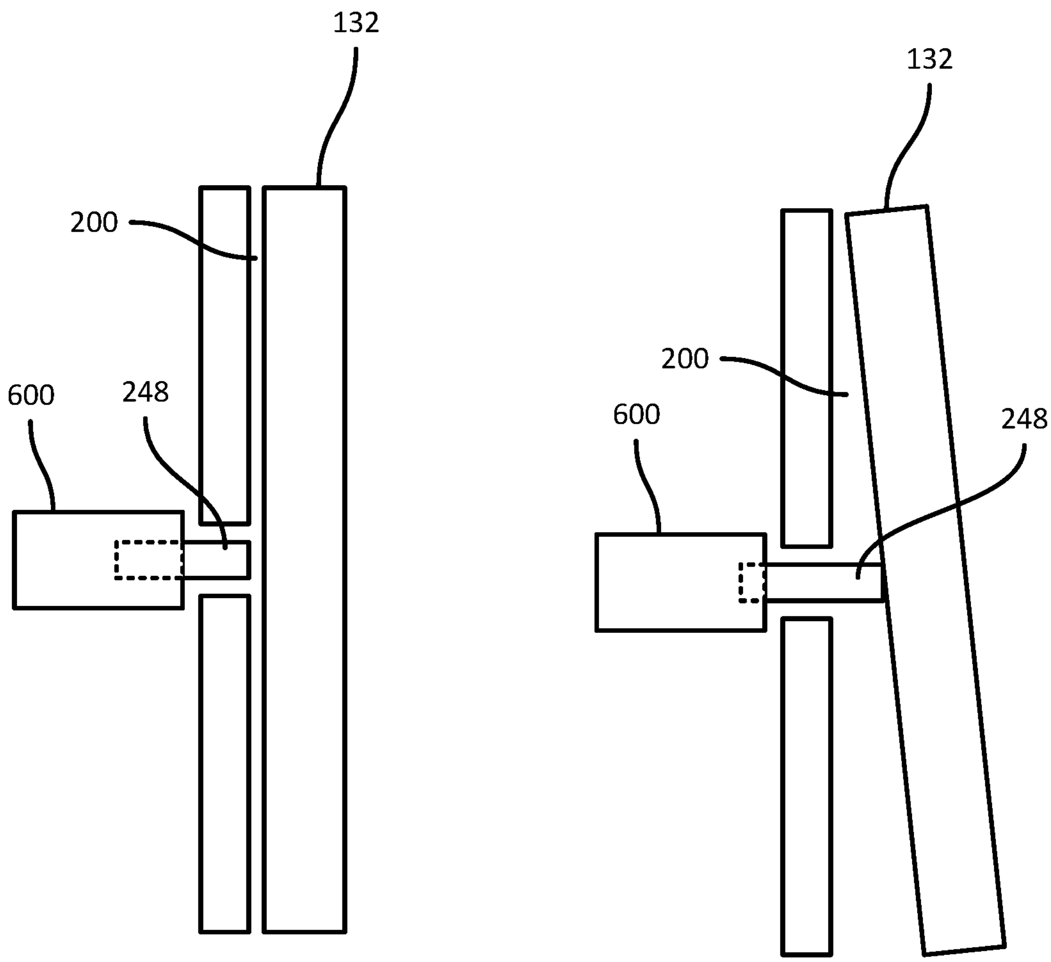

Turning to FIG. 6, a schematic diagram of the bias member 248 is shown. The bias member 248, e.g., when implemented as a spring-loaded pin, can be movable within a housing 600 supported within the housing 104. The bias member 248 is movable between a retracted position, in which the bias member 248 is withdrawn from the chamber 200 as a result of pressure applied by the access door 132 (which is maintained in the closed position by the tab 240 and slot 244, as noted earlier). In the extended position, shown on the right-hand side of FIG. 6, the bias member 248 extends from the housing 600 into the chamber 200, e.g., in response to unlocking of the latch 236. As a result, the bias member 248 pushes the access door 132 from the closed position to an intermediate position between the open and closed positions.

Figure 7:
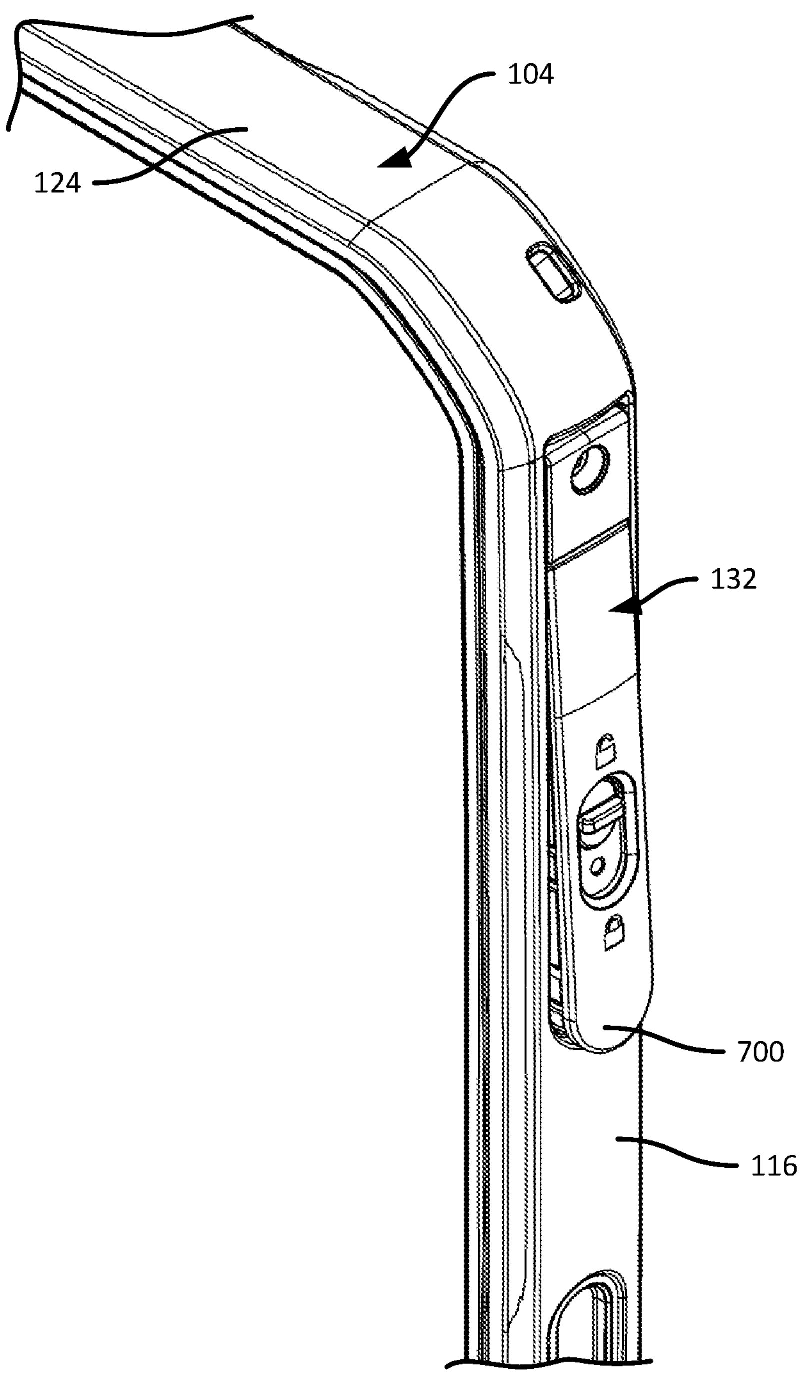
FIG. 7 is a diagram illustrating the access door of the FIG. 2 in an intermediate position.
Figure 8:
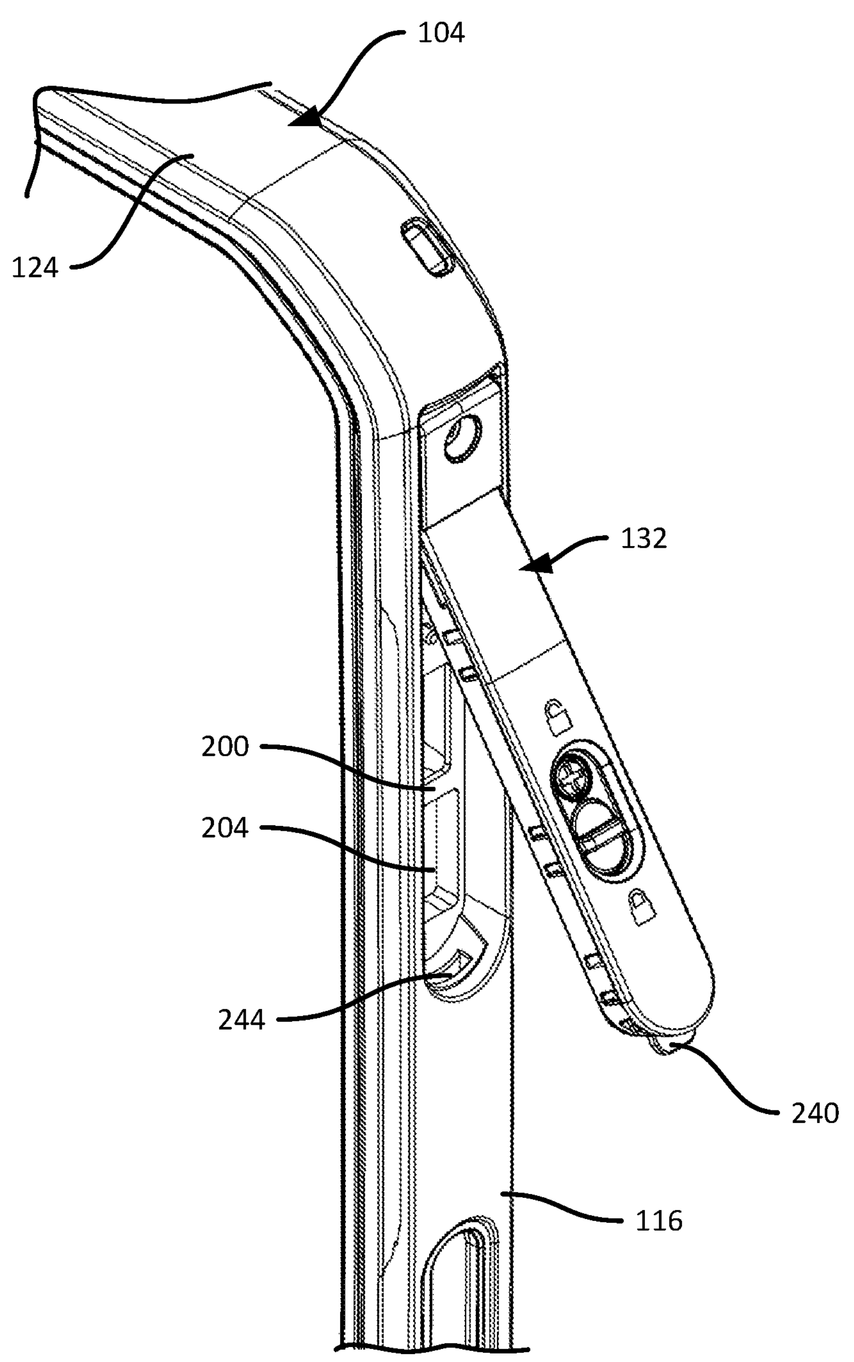
FIG. 8 is a diagram illustrating the access door of the FIG. 2 in an open position.

FIG. 7 illustrates the access door 132 in the above-mentioned intermediate position. As shown in FIG. 7, full extension of the bias member 248 into the chamber 200 moves the access door 132 partially out of the chamber 200. A lower portion 700 of the access door 132 can then be grasped, e.g., by an operator of the device 100, to move the access door 132 towards an open position, as shown in FIG. 8.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:

a housing having an exterior wall, the exterior wall defining a chamber;

an access door movably coupled to the housing between a closed position enclosing the chamber, and an open position exposing the chamber to an exterior of the computing device;

a latch movable between a locked position to retain the access door in the closed position, and an unlocked position to permit movement of the access door;

and a bias element configured to apply a force to the access door to move the access door from the closed position to an intermediate position between the open and closed positions, in response to transition of the latch from the locked position to the unlocked position, wherein the access door moves by rotating about an axis defined by a living hinge and disposed above the bias element.

2. The computing device of claim 1, further comprising: a communications port disposed within the chamber and accessible from the exterior of the computing device when the door is in the open position.

3. The computing device of claim 1, wherein the access door seals the chamber from the exterior of the computing device in the closed position.

4. The computing device of claim 1, wherein the bias element includes a pogo pin.

5. The computing device of claim 4, wherein the pogo pin is affixed to the housing within the chamber, and is configured to extend into the chamber.

6. The computing device of claim 1 wherein the access door further comprises:

a body; and a cover affixed to the body;

wherein the latch is supported between the body and the cover.

7. The computing device of claim 6, wherein the cover includes an opening on an exterior surface, and wherein the latch includes an actuator accessible via the opening.

8. The computing device of claim 6, wherein the body includes a protrusion; and wherein the latch includes a resilient detent configured to engage with the protrusion to maintain the latch in either of the locked and unlocked positions.

9. The computing device of claim 8, wherein the protrusion includes a first inclined surface configured to engage with the detent during movement of the latch towards the locked position, and a second inclined surface configured to engage with the detent during movement of the latch towards the unlocked position.

10. The computing device of claim 9, wherein the first inclined surface has a larger angle, relative to the body, than the second inclined surface.

11. The computing device of claim 6, wherein the cover includes a first cover member defining the living hinge, and a second cover member affixed to the first cover member.

12. The computing device of claim 11, further comprising a fastener configured to affix the first cover member to the housing of the computing device.

13. The computing device of claim 6, further comprising a slot extending into the housing from the chamber;

wherein the latch includes a tab receivable in the slot when the latch is in the locked position.

14. The computing device of claim 6, wherein the body includes a first aperture, and the latch includes a second aperture;

the first and second aperture configured to receive a fastener to secure the latch to the body to retain the latch in the locked position.

* * * * *